(12) United States Patent
Zupancic et al.

(10) Patent No.: US 6,296,278 B1
(45) Date of Patent: Oct. 2, 2001

(54) ROLLOVER PROTECTION APPARATUS

(75) Inventors: Manuela Zupancic; Michael Ness, both of Bergneustadt; Reinhard Nowack, Drolshagen, all of (DE)

(73) Assignee: ISE Innomotive Systems Europe GmbH, Bergneustadt (DE)

( * ) Notice: Subject to any disclaimer, the term of this patent is extended or adjusted under 35 U.S.C. 154(b) by 0 days.

(21) Appl. No.: 09/368,768

(22) Filed: Aug. 20, 1999

(30) Foreign Application Priority Data

Aug. 27, 1998 (DE) .............................................. 198 38 989

(51) Int. Cl.⁷ .................................................. B60R 21/13
(52) U.S. Cl. ............................................ 280/756; 280/753
(58) Field of Search ..................................... 280/756, 753; 180/282; 296/190.03, 180.1, 85

(56) References Cited

U.S. PATENT DOCUMENTS

| | | | | |
|---|---|---|---|---|
| 5,056,816 | * | 10/1991 | Lutze et al. ........................... | 280/756 |
| 5,205,585 | * | 4/1993 | Reuber et al. ........................ | 280/753 |
| 5,236,219 | | 8/1993 | Jambor et al. ........................ | 280/756 |
| 5,626,361 | * | 5/1997 | Heiner .................................. | 280/756 |
| 5,655,791 | * | 8/1997 | Nowack et al. ...................... | 280/756 |
| 5,671,947 | | 9/1997 | Henn .................................... | 280/756 |

FOREIGN PATENT DOCUMENTS

| | | |
|---|---|---|
| 43 14 538 | 11/1994 | (DE) . |
| 195 23 790 | 1/1997 | (DE) . |
| 0 657 328 A1 * | 12/1994 | (EP) . |
| 0 729 867 A1 * | 9/1996 | (EP) . |
| WO 95/03952 | 2/1995 | (WO) . |

* cited by examiner

Primary Examiner—Lanna Mai
Assistant Examiner—Ruth Ilan
(74) Attorney, Agent, or Firm—Hudak & Shunk Co., L.P.A.

(57) ABSTRACT

The invention addresses a rollover protection apparatus for motor vehicles with a protection system assigned to each vehicle seat. The invention provides that the profile unit is designed in the form of a box profile rigidified against bending with guide elements on the narrow sides of the profile elements and one single spring drive mechanism disposed centrally in the profile bar unit and with a pawl/ratchet mechanism mounted parallel to the bar width in a curved projection of the profile bar unit. These measures create a rollover protection apparatus that comprises only a few parts, is simple to manufacture and the depth of which can be kept very shallow.

18 Claims, 4 Drawing Sheets

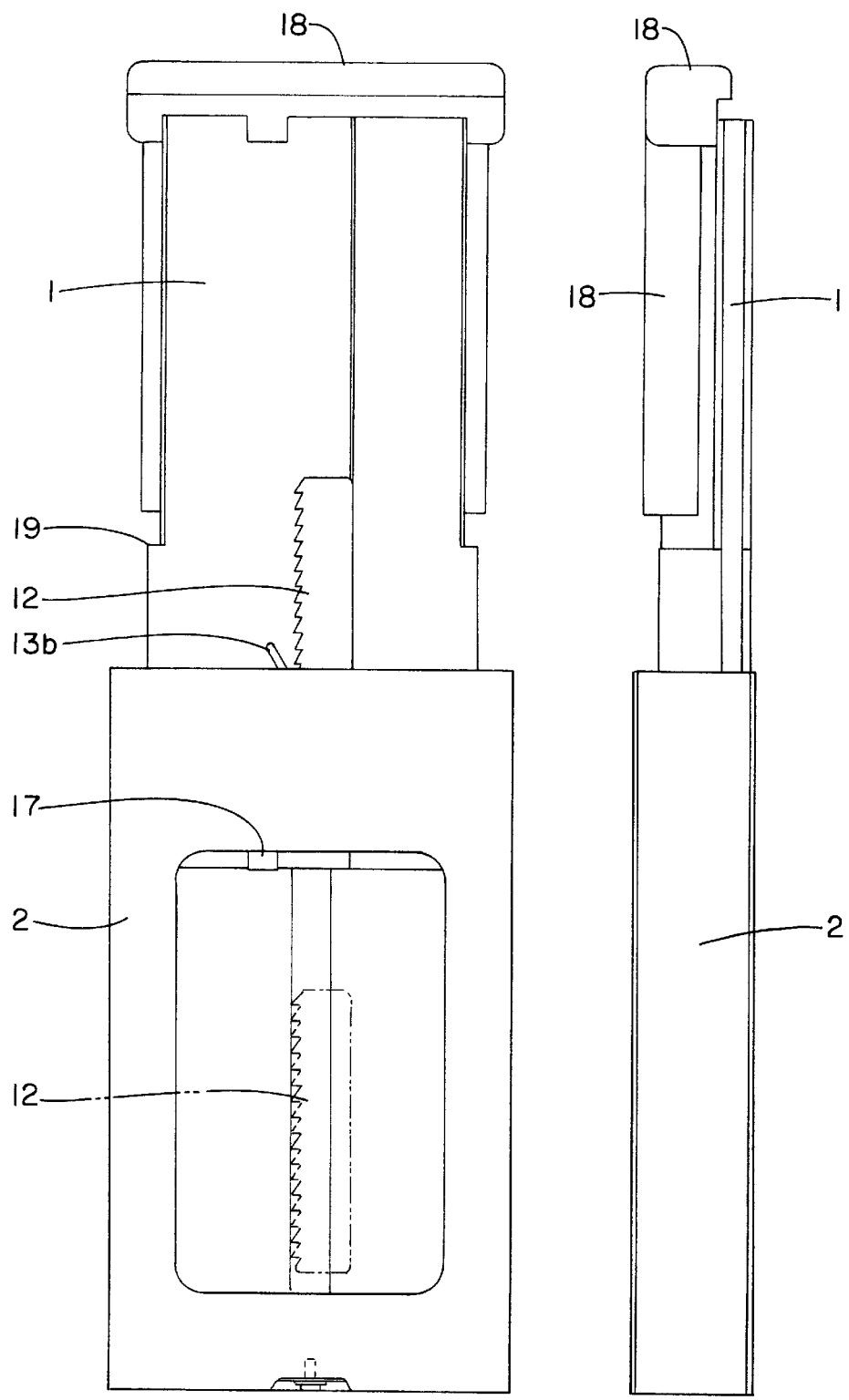

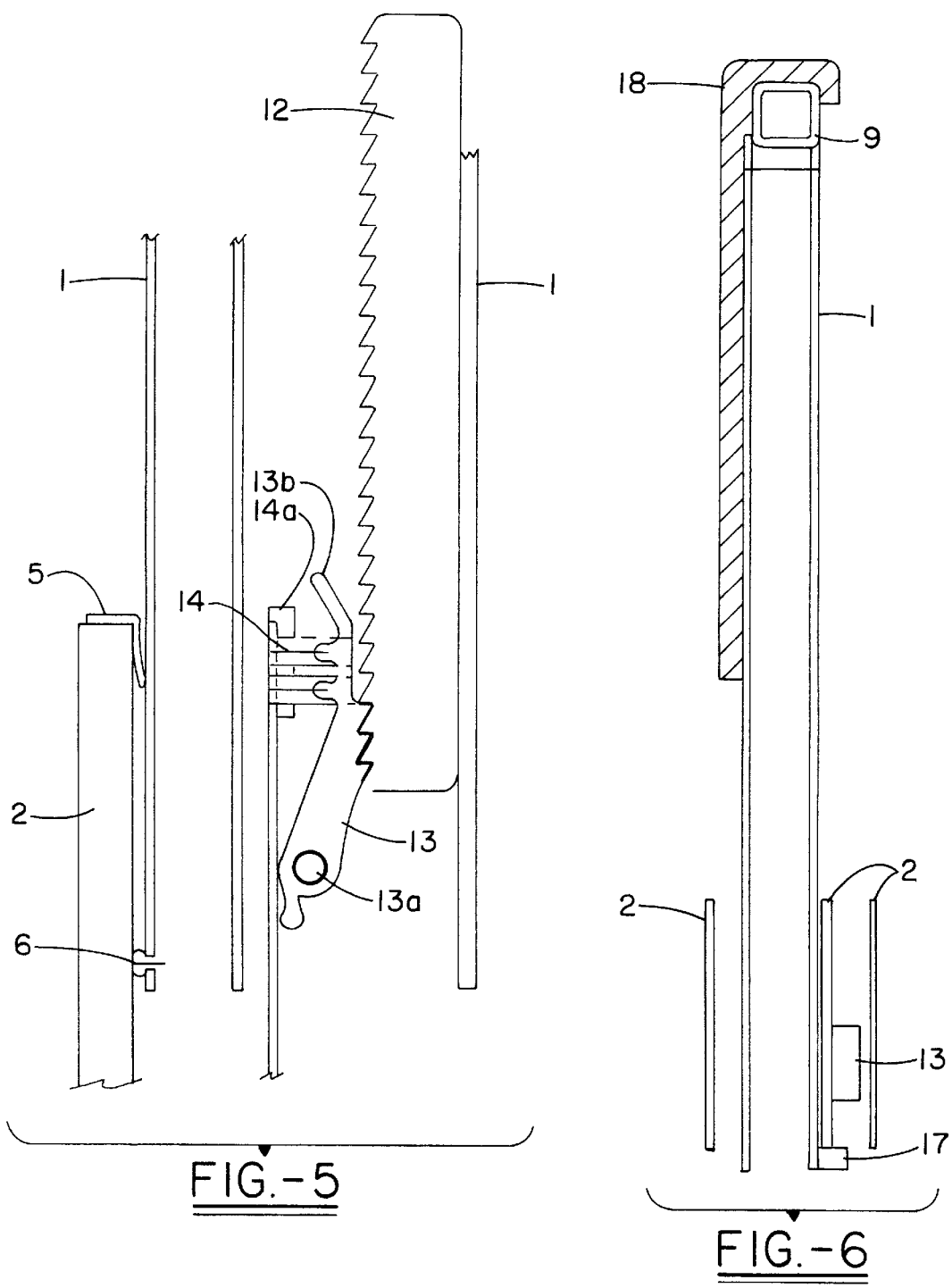

ROLLOVER PROTECTION APPARATUS

BACKGROUND OF THE INVENTION

The invention relates generally to a roll-bar, or rollover protection for use in passenger vehicles having a simplified construction consisting of a profile bar unit and a guide unit each defined as a structurally reinforced box profile.

To protect the occupants of passenger vehicles as well as tractors, it is known to provide vehicles with a rollover protection apparatus. In practice, two systems have become established.

The one system provides for a fixed rollover bar, sometimes referred to as "handle," spanning the entire vehicle width.

In the second system, addressed by the invention as well, each vehicle seat has an associated rollover bar, which in its rest position is hidden inside a cassette fixed to the vehicle and at the start of a rollover motion rapidly extends into a self-locking support position.

These extendable rollover bars are typically U-shaped with tubular legs that are vertically guided in standpipes of the cassettes. Inside each leg, a spiral spring is disposed, which is kept under initial tension by a holding mechanism that can be released by a rollover sensor. This causes the rollover bar to be pushed out of the cassette within a few tenths of a second by the action of the spring and to be locked in its support position. To create the U-shape nature of the bar, the two tubular legs are interconnected by a transversely extending segment, over which a padded cover is placed.

It is known from prior art (WO 95/03952) to fabricate the tubular elements of the rollover bar from high-strength steel, partly using steel tubes, partly sheet metal half shells. This construction is complex and thus costly. Furthermore, the employed structural elements are very heavy, which is not only undesirable in principle, but also requires particularly powerful driving springs for the rapid extension of the rollover bar to permit the relatively heavy bar to be brought into its support position in the shortest possible time.

A rollover bar has therefore been disclosed (DE 43 14 538 A1) in which particularly the legs of the rollover bar and the guiding standpipes are made of extruded profiles. Since extruded profiles have the advantage of reduced weight compared to steel tubes and are cheaper to produce, this prior art rollover bar is not only comparatively light, but can also be produced at low cost.

But for rollover bars it is particularly important that the material be very rigid so as to prevent head injuries of the vehicle occupants due to buckling of the rollover bar as the vehicle turns over. Extruded profiles, however, due to the relatively soft aluminum or aluminum alloys used, are by nature easily deformable.

To increase the rigidity of the bar unit, DE 195 23 790.0 A1 discloses the use of an extruded profile with tubular legs that are interconnected by a joining plate to form a single part. The extrusion preferably forms a spectacle-shaped profile. This profile bar unit is enclosed over part of its length by a one-piece guide block, preferably also made from a profile section. This guide block is mounted in and enclosed by a sheet metal cassette, which forms the outer housing of the rollover bar and which in turn is directly fixed to the vehicle, e.g., to the rear wall of the passenger space of a convertible.

In the aforementioned prior art, the extrusion defining the bar spans the entire width of the bar with its profile. Nevertheless, this prior art profile corresponds to the typical basic structure of a rollover bar with two tubular leg parts, in each of which a spring mechanism is disposed and approximately ¾ of the circumference of each encloses a standpipe, which is attached to the floor of the cassette.

In addition to the guidance of the profile bar unit by means of its bar legs in the standpipes, the guide block is provided with four plastic sliding elements disposed in recesses, which are in sliding contact with the profile bar unit to guide it.

In the clearance between the bar legs, a toothed rack is centrally mounted on the profile bar unit. This rack interacts with a locking pawl pivotably mounted on the guide block in the locking mechanism housing vertically to the width of the bar unit and actively engageable with the teeth of the rack by means of two catch springs such that the profile bar unit can at any time be extended upwardly into its support position in that the locking pawl moves across the teeth of the rack, whereas any downward motion in the direction of the basic position is prevented due to the active engagement of the pawl with the respective tooth of the rack. The rack in combination with the locking pawl thus serves to automatically lock the rollover unit into its support position when a force is applied to the profile bar unit as a result of an overturn.

On the locking mechanism housing of the guide block, an unlocking pawl is furthermore pivotably mounted in the same plane as the locking pawl, which with a hook-shaped nose actively engages with a pin on the profile bar unit and thus holds the latter in the locked basic position against the force of the pretensioned drive spring. This unlocking pawl is associated with a power element, for example, a pin-expelling pyrotechnically actuated cartridge or a crash magnet, which, activated by a rollover sensor, mechanically brings the unlocking pawl out of its engagement with the pin on the profile bar unit and thus triggers the extension motion of the profile bar unit in the event of a crash.

On the upper end face of the profile bar unit, a cross strut is mounted, which is covered by an unpadded plastic cap.

Since in the prior art profile bar, the wall thickness of the joining plate between the two tubular bar leg profile components is relatively thin, the rigidity against buckling must be entirely provided by the tubular bar leg profile components, which requires a relatively large diameter and wall thickness. Thus, the depth of the profile and consequently that of the exterior guide mechanism or cassette receiving it is relatively large.

Due to the profile shape of the prior art bar unit, the bar leg profile components enclose the standpipe only partly at a tight distance so that guidance by the standpipes is insufficient and additional means for guidance must be provided.

Furthermore, due to the profile shape, each leg must be provided with its own drive in conventional manner. As a result, drive complexity is exactly comparable to that of a rollover protection system with U-shaped rollover bar.

In the prior art case, the guide block is made relatively short in axial direction. As a result, an additional component, the cassette, is required to receive the guide block and the profile bar unit.

The plastic cover, since it is unpadded, cannot dampen the impact of the head of a vehicle occupant.

SUMMARY OF THE INVENTION

The purpose of the invention is to design the initially described rollover protection apparatus for motor vehicles with a protection system assigned to each vehicle seat comprising a cassette fixed to the vehicle, a rollover unit in the form of a profile bar unit spanning the entire width of the cassette extendably mounted and guided in guides within the cassette, a pawl/ratchet mechanism for automatic locking of the extension motion, and a spring drive mechanism for extending the profile bar unit with a pretensioned pressure spring engaging with the profile bar unit and with a mechanical locking mechanism for keeping the pressure spring in its pretensioned state, which is associated with a release mechanism unlocking it if the vehicle is overturned, such that the device comprises only a few parts, is simple to manufacture, and its depth may be kept shallow.

According to the invention, this object is attained by the following features:

the profile bar unit is designed in the form of a box profile and is rigidified against bending, the cassette is designed as a box profile guide unit rigidified against bending and spanning the full cassette height, on the narrow sides of the profile bar unit and the guide unit cassette, mutually complementary guide elements are formed, the spring drive mechanism has only one single pressure spring centrally disposed in the profile bar unit, the pawl/ratchet mechanism is disposed parallel to the bar width in a curved projection of the profile bar unit, the upper part of the profile bar unit is covered with foamed plastic, and the release mechanism with the associated element of the locking mechanism is disposed in the floor area of the guide unit cassette and the counter element of the locking mechanism is disposed in the lower area of the profile bar unit.

The rollover protection apparatus claimed by the invention has the advantage of having only two basic elements displaceable with respect to each other, the profile bar unit designed as a box profile and rigidified against bending and the guide unit designed as a box profile and rigidified against bending, which simultaneously forms the cassette, i.e., the housing of the rollover protection apparatus. This profile shape of the two basic elements ensures high force absorption, particularly with respect to longitudinal bending.

Guiding the profile bar unit along its narrow sides and eliminating the tubular bar legs in conjunction with the standpipes disposed in the cassette results in simpler guidance. In addition, due to the narrow box profile of the bar unit and the guide unit, the depth of the rollover protection apparatus can be kept very shallow, which significantly facilitates stowing within the vehicle, since space is known to be tight in a convertible in any case.

The centrally disposed drive with only one single pressure spring also significantly simplifies the drive mechanism and makes it less costly to produce.

Mounting the pawl/ratchet mechanism parallel to the bar width in a curved projection of the profile bar unit makes efficient use of the space since the projection requires only little depth. In contrast, in the prior art profile bar unit, the pawl/ratchet mechanism is vertical to the bar width, which requires a correspondingly deep projection and, in conjunction with the tubular bar legs, results in the spectacle-type profile of the known bar unit.

Due to the box-shaped design of the profile unit, its front surface is flat throughout, which makes it easier to pad with foamed plastic to dampen any head impact.

Stowing the locking mechanism with the triggering system in the lower part of the guide unit cassette makes optimal use of the space available there and eliminates the need for another curved projection in the upper area of the profile unit.

Thus the rollover protection apparatus for motor vehicles as claimed by the invention consists of only a few parts and is simple and thus inexpensive to produce. It is well known that cost control in automobile manufacturing, particularly in the component supplier area, is crucial to remaining competitive.

The profile guide unit is preferably made of a one-piece box profile to permit very simple production.

However, the profile guide unit can also be assembled into a box profile from at least two profiles. In this type of embodiment, the profile components are cheaper to produce but the required assembly increases the production costs, so that the two have to be weighed against each other in the individual case.

According to a further embodiment of the invention, both the front and the rear wall of the profile guide unit are provided with a mounting flange at both ends. This makes it possible to mount the profile guide unit, which simultaneously forms the cassettes, either on one wall or between two walls within the vehicle. Since the profile guide unit is typically mounted via the flange by means of screws, inserting the mounting screws through two opposite flange parts of the profile guide unit makes it possible to provide further stability against bending forces. The profiles of the profile unit are preferably made of extrusions, which are available at low cost and when designed according to the invention are capable of absorbing the bending forces that occur. The profiles are preferably provided with rigidifying segments and curved projections so that the profile shape permits high force absorption, particularly with respect to longitudinal bending.

Good space utilization for the self-locking mechanism of the extension motion of the profile bar unit is achieved if the pawl/ratchet mechanism has a toothed rack and a locking pawl with a catch spring, whereby the rack is mounted on the narrow side of the curved projection on the profile bar unit crosswise to its width and the locking pawl with catch spring is pivotably coupled to an opposite strip of the profile guide unit in the plane of the profile bar unit. This crosswise arrangement of the rack, which is preferably die cut, makes it possible to keep the depth of the curved projection very shallow.

According to a further development of the invention, the guide elements on the narrow sides of the profile are provided with plastic sliding elements.

A particularly simple and nevertheless highly effective arrangement is achieved if, in a further development of the invention, the guide element on the profile bar unit is formed as a continuous axial groove in which a plastic sliding element is mounted in the lower area and the guide element on the profile guide unit is formed as a projection, which is complementary to this groove and at its upper end is provided with a cap-like plastic sliding element.

An advantageous arrangement of the drive mechanism is given if according to yet another development of the invention, at the upper end face of the profile bar unit, a cross member is mounted against which rests the upper part of the pressure spring, which in its pretensioned state encloses a spring guide pin, which is fixed upright to the floor of the profile guide unit, against which the lower part of the pressure spring rests. Since the spring guide pin is thus stationary, it advantageously does not enter into the accelerating mass in the event of a crash.

According to one embodiment of the invention, to limit the extension motion of the profile bar unit, an end stop is provided in the lower end region of the profile bar unit and an opposite end stop in the upper end region of the profile guide unit.

To increase bending stiffness in the extended state of the profile bar unit, reinforcement elements are provided in the upper region of the profile guide unit along its narrow sides, toward the narrow sides of the profile bar unit, in order to increase the longitudinal bending stiffness in the extended state of the profile bar unit.

Additional embodiments and advantages of the invention will become evident from the description of the exemplary embodiment illustrated in the drawings.

BRIEF DESCRIPTION OF THE DRAWINGS

The following show:

FIG. 2a is a rear top view of the rollover protection apparatus according to FIG. 1, FIG. 3a is a side view of the rollover protection apparatus according to FIG. 1, FIG. 5a is a detailed view from FIG. 1 showing an enlarged view of the self-locking of the profile bar unit by means of a pawl/ratchet mechanism, and FIG. 6 shows the inner construction of the rollover protection apparatus according to FIG. 1 in a lateral longitudinal section.

DETAILED DESCRIPTION OF THE INVENTION

Figure 1:
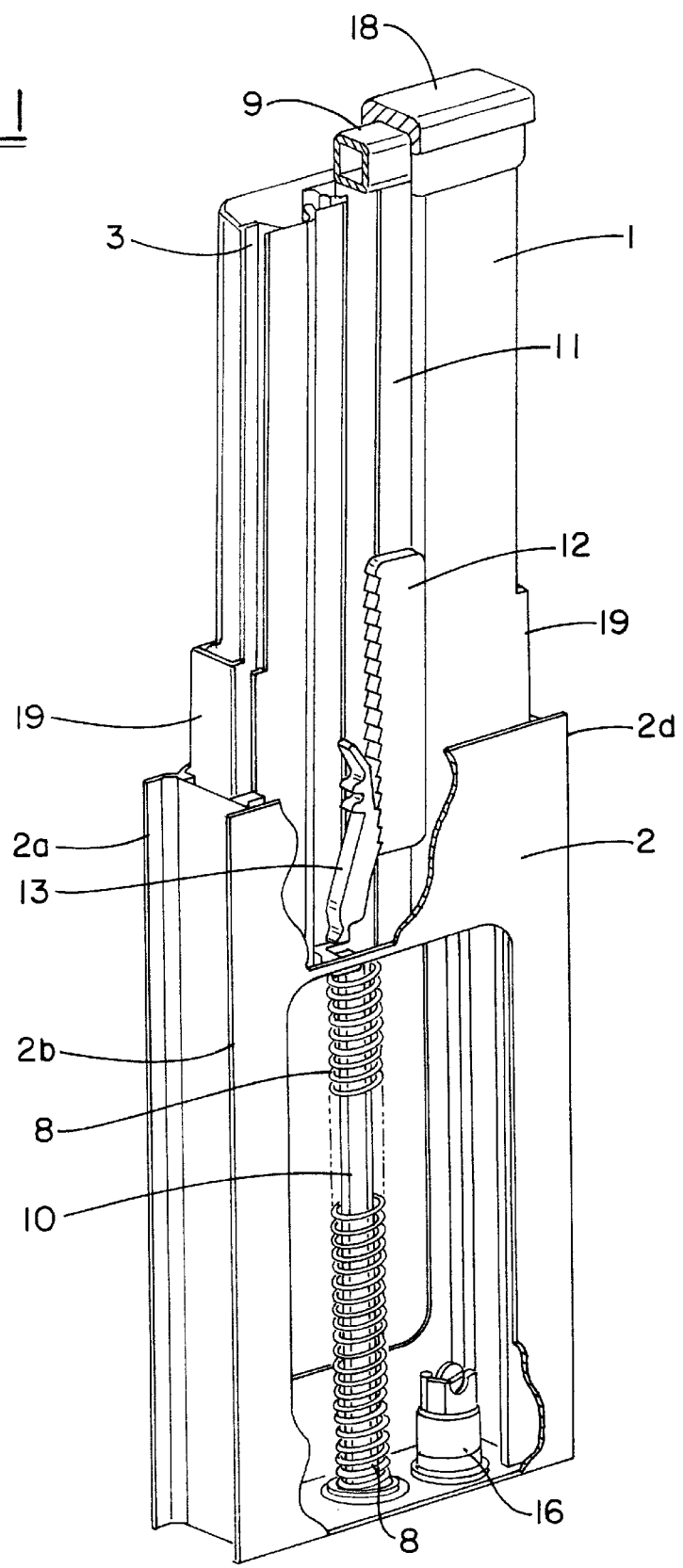
FIG. 1a is a perspective view of the rollover protection apparatus as claimed by the invention with the profile bar unit and the profile guide unit in the extended state of the profile bar unit.

The drawings show various views and details of a particularly advantageous embodiment of the inventive rollover protection apparatus for motor vehicles in the form of a protection system assigned to each vehicle seat. This protection system comprises two basic elements, a rollover unit that can be extended into a support position in case of a crash (FIG. 1) in the form of a profile bar unit 1 consisting of a box type basic profile, which spans the entire bar width, and a profile guide unit 2 fixed to the vehicle, which is also made of a box-type basic profile and in which the profile bar unit 1 is guidingly supported.

In the basic position of the rollover unit, the profile bar unit 1 is largely received by the profile guide unit 2 except for its uppermost segment, i.e., the profile guide unit simultaneously serves as a cassette for the protection system.

Both on the front and on the rear wall, the profile guide unit 2 has two mounting flanges each 2a, b, c, and d, which serve to attach the protection system in the vehicle either to one vehicle wall or between two walls. It is also feasible to screw the profile guide unit 2 to a vehicle wall with long screws, which are pushed through the holes in the two flanges one behind the other, whereby the tightened screws provide additional stability to the profile guide unit, the cassette, against bending forces.

The box-type profile shape in conjunction with the strips and recesses in the profile units shown in the figures makes it possible to achieve high force absorption, particularly with respect to longitudinal bending.

At the two narrow sides of the profile units 1, 2, mutually complementary guide elements are formed, a groove-shaped profile indentation 3 on the profile bar unit 1 and a complementary projection 4 on the profile guide unit 2, both of which are provided with sliding elements. A sliding block 5 is mounted at the upper end of the complementary projection 4 (FIG. 5). Likewise, a sliding element 6 with preferably a circular cross-section is mounted in groove 3. These sliding elements are preferably made of a synthetic material, particularly Teflon. These guide elements 3 through 6 provide simple but safe and effective guidance of bar unit 1, which can be extended from guide unit 2. However, embodiments with a plurality of sliding elements mounted one over the other on the projection as well as in the groove are also possible.

The protection system claimed by the invention has only a single, centrally disposed spring drive. In a reinforced central area of the profile bar unit 1 (see FIG. 4), an opening 7 is formed, which receives a pressure spring 8. This pressure spring 8 with its lower end rests against a base plate of the profile guide unit 2 and with its upper end against a cross member 9, which is connected with the upper end face of the profile bar unit 1, covering the latter. On this base plate, a spring guide pin 10, which has a cross-shaped profile, is permanently mounted in upright position and, in the retracted state of profile bar unit 1, i.e., in the pretensioned state of pressure spring 8, guidingly penetrates the latter. This spring drive in the pretensioned state of pressure spring 8 forms an energy storage mechanism for the extension movement of the rollover unit in the form of the profile bar unit 1 in case of a crash.

To self-lock the extended profile bar unit 1, i.e., to prevent the bar unit from being pushed together again against the pressure spring in the direction of the guide unit 2 as a result of the impact as the vehicle rolls over, a pawl/ratchet mechanism is provided, which is mounted parallel to the width of the bar unit. This pawl/ratchet mechanism has a toothed rack 12 and a locking pawl 13 with pretensioned catch springs 14. Toothed rack 12 is fixed to profile bar unit 1 on a narrow side of projection 11, whereas locking pawl 13 with catch springs 14 and a spring centering clip 14a is pivotably coupled by means of a bolt 13a to a strip 15 of profile guide unit 2 opposite the narrow side. Pawl 13 has an extension 13b with which the locking mechanism can be manually released.

Thus, as profile bar unit 1 extends, the teeth of the rack move across pawl 13, whereas when it moves in the opposite direction, the teeth of pawl 13, in the exemplary embodiment three teeth, remain engaged with the respective teeth of the rack and prevent any downward movement in the direction of the rest position.

Mounting the preferably die cut toothed rack 12 crosswise to the bar extension makes it possible to arrange the pivot motion of the pawl in a plane parallel to the bar extension for good space utilization and minimal depth of the curved projection 11.

To hold the pressure spring 8 in its pretensioned state, a mechanical locking mechanism is provided, which is associated with a release system for unlocking it if the vehicle rolls over. This release system comprises a power element 16, e.g., a pin-ejecting, pyrotechnically actuated cartridge or a crash magnet mounted on the floor of the guide unit 2. The locking mechanism typically comprises a pawl, which in the rest position is in locking engagement with a corresponding pin mounted in the lower area of the profile bar unit 1. The pawl, with respect to the power element 16, is disposed in such a way that if the vehicle rolls over, the power element, triggered by a corresponding sensor within the vehicle, unlocks the pawl, i.e., releases the pin on the profile bar unit 1, which causes the spring drive to propel the bar unit upwardly into its support position. Such locking mechanisms with the associated release mechanisms are known per se and need not be further described here. In principle, all known types of these mechanisms may be used to keep the profile bar unit 1 in its rest position and to effect unlocking if the vehicle rolls over.

The upper part of the profile bar unit 1 is padded with foamed plastic to cushion any impact of the head of a vehicle occupant. As may be seen in particular in FIG. 4, the corresponding foam layer 18 encompasses the entire front area of the box profile of bar unit 1 and continues over nearly the entire angled narrow side of the box profile. The axial height of the foam covering is selected such that substantially the entire front area projecting from the profile guide unit in the extended state is covered with the foam layer 18 (FIG. 3).

In the lower end area of profile bar unit 1, an end stop 17 and in the upper end area of profile guide unit 2 an opposite end stop is provided on the pawl mounting, which limit the extension motion of the profile bar unit 1 (FIG. 6).

Figure 4:
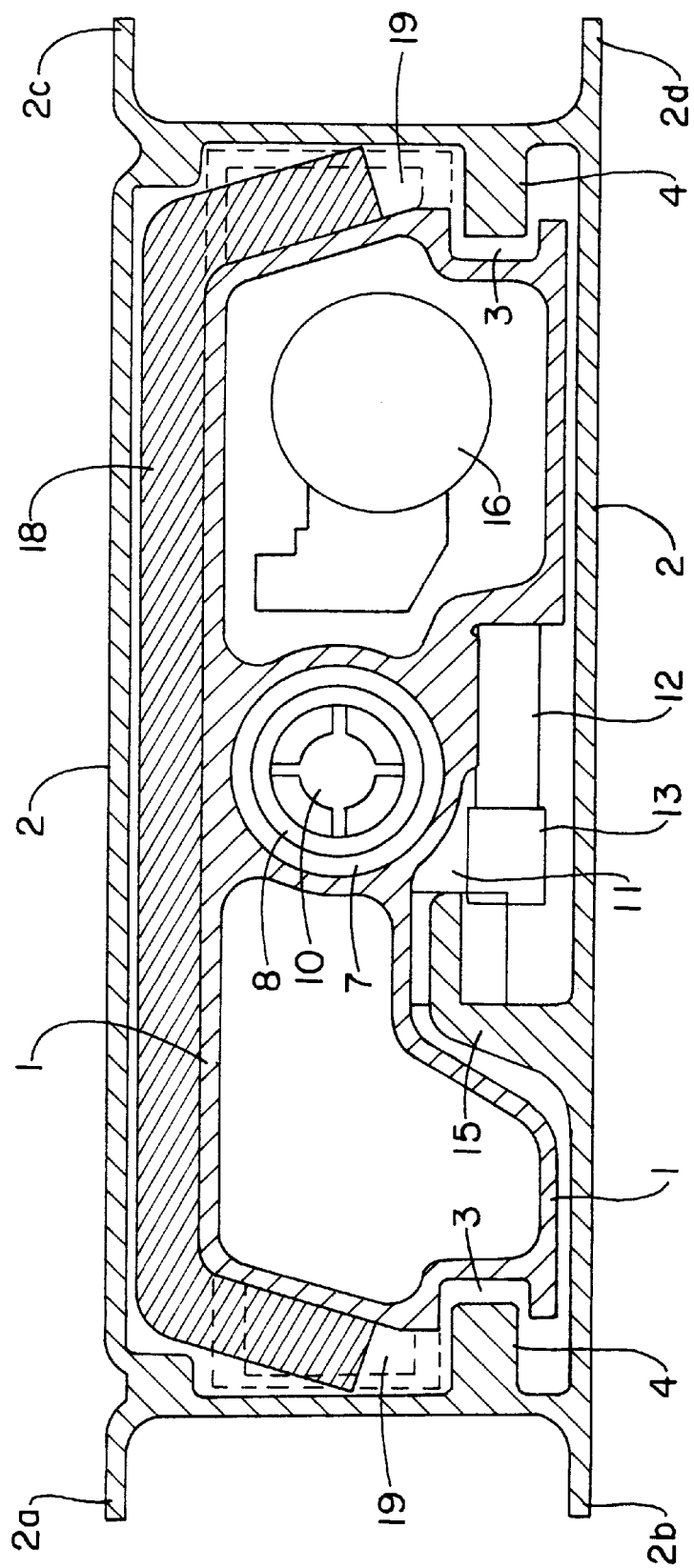
FIG. 4a is a cross-section through the rollover protection apparatus according to FIG. 1.

To increase the bending strength of the profile bar unit in its extended state, a reinforcement 19 is formed on its narrow sides respectively (FIG. 1 and 4).

What is claimed:

1. Rollover protection apparatus for motor vehicles with a protection system assigned to each vehicle seat comprising:
   a cassette adapted to be fixed to a vehicle,
   a rollover unit in the form of a profile bar unit substantially spanning the entire width of the cassette extendably supported and guided within the cassette,
   a pawl/ratchet mechanism for automatic locking of the profile bar unit, and
   a spring drive mechanism for extending the profile bar unit with a pretensioned pressure spring engaging with the profile bar unit and with a mechanical locking mechanism for keeping the pressure spring in a pretensioned state, which is associated with a release mechanism which unlocks the mechanical locking mechanism if the vehicle is overturned, wherein the profile bar unit is box shaped and rigidified against bending, wherein the cassette is a box shaped profile guide unit rigidified against bending, wherein on narrow sides of the profile bar unit and the guide unit cassette mutually complementary guide elements are formed, wherein the spring drive mechanism has a single pressure spring centrally disposed in the profile bar unit,
   wherein the pawl/ratchet mechanism is disposed parallel to a width of the profile bar unit,
   wherein the upper part of the profile bar unit is covered with foamed plastic, and
   wherein the release mechanism and locking mechanism are disposed in a floor area of the guide unit cassette and a counter element of the locking mechanism is disposed in a lower area of the profile bar unit.

2. Rollover protection apparatus according to claim 1, wherein the profile guide unit is made of a single piece.

3. Rollover protection apparatus according to claim 1, wherein the profile guide unit is made from at least two components.

4. Rollover protection apparatus according to claim 2, wherein the profile guide unit has a front and a rear wall which are provided with mounting flanges.

5. Rollover protection apparatus according to claim 1, wherein the profile bar unit and the profile guide unit are made of extruded sections.

6. Rollover protection apparatus according to claim 1, wherein the profile bar unit and profile guide unit are provided with reinforcing strips and projections.

7. Rollover protection apparatus according to claim 1, wherein the paw/ratchet mechanism has a toothed rack and a locking pawl with a catch spring, whereby the toothed rack is mounted on a narrow side of a projection on the profile bar unit and the locking pawl with a catch spring is pivotably coupled to an opposite strip of the profile guide unit in a plane of the profile bar unit.

8. Rollover protection apparatus according to claim 1, wherein the guide elements are provided with plastic sliding elements.

9. Rollover protection apparatus according to claim 8, wherein the guide element on the profile bar unit is formed as an axially continuous groove to which a synthetic sliding element is attached in the lower area and that the guide element on the profile guide unit is formed as a projection, which is complementary to this groove and has a cap-like plastic sliding element at its upper end.

10. Rollover protection apparatus according to claim 1, wherein on an upper end face of the profile bar unit a cross member is mounted against which an upper part of the pressure spring rests, and which in said pretensioned state surrounds a spring guide pin, which is permanently fixed in upright position on the floor of the profile guide unit against which a lower part of the pressure spring rests.

11. Rollover protection apparatus according to claim 1, wherein a lower end area of the profile bar unit an end stop and in an upper end area of the profile guide unit an opposite end stop is provided.

12. Rollover protection apparatus according to claim 11, wherein in the upper area of the profile guide unit, on the narrow sides, toward the narrow sides of the profile bar unit, reinforcing elements are provided to increase the longitudinal bending strength in the extended state of the profile bar unit.

13. A rollover protection apparatus for a motor vehicle seat comprising:
   a box shaped cassette adapted to be fixed to a vehicle, said cassette having guide elements;
   a box shaped profile bar unit substantially spanning the entire width of the bar unit and extendably supported by said guide elements of said cassette;
   a spring drive mechanism for extending said profile bar unit having a pressure spring centrally disposed in said cassette and engaging said profile bar unit; and
   a pawl/ratchet mechanism disposed parallel to a width of said profile bar unit for automatic locking.

14. A rollover protection apparatus according to claim 13, wherein said spring drive mechanism includes a mechanical mechanism for locking said pressure spring in a pretensioned stated and releasing said pressure spring when the vehicle is overturned, said mechanical mechanism operatively located between a floor area of said cassette and a lower area of said profile bar unit.

15. A rollover protection apparatus according to claim 14, wherein the pawl/ratchet mechanism has a toothed rack and a locking pawl with catch spring, wherein the toothed rack is mounted on the profile bar unit, and wherein the locking pawl with catch spring is pivotally coupled to the cassette in a plane of the profile bar unit.

16. A rollover protection apparatus according to claim 14, wherein on an upper end face of the profile bar unit a cross member is mounted against which a part of the pressure spring rests, and wherein said pressure spring surrounds a spring guide pin which is permanently fixed in upright position on said floor area of said cassette against which a lower part of the pressure spring rests.

17. A rollover protection apparatus according to claim 16, wherein an upper part of the profile bar unit is covered with foamed plastic.

18. A rollover protection apparatus according to claim 16, wherein an end stop is provided in a lower end of said profile bar unit, and wherein an end stop is provided in an upper area of said cassette.

* * * * *

UNITED STATES PATENT AND TRADEMARK OFFICE
CERTIFICATE OF CORRECTION

PATENT NO.    : 6,296,278 B1
DATED         : October 2, 2001
INVENTOR(S)   : Manuela Zupancic, Michael Nass and Reinhard Nowack It is certified that error appears in the above-identified patent and that said Letters Patent is hereby corrected as shown below:

<u>Title page,</u>
Item [75], Inventors: replace "Michael Ness" with -- Michael Nass --.

Signed and Sealed this

Twenty-sixth Day of March, 2002

Attest:

JAMES E. ROGAN
Attesting Officer    Director of the United States Patent and Trademark Office